(12) United States Patent
King (10) Patent No.: US 7,677,088 B2
(45) Date of Patent: Mar. 16, 2010

(54) CANTILEVER PROBE AND APPLICATIONS OF THE SAME

(75) Inventor: William P. King, Champaign, IL (US)

(73) Assignee: Intellectual Properties Partners LLC, Atlanta, GA (US)

( * ) Notice: Subject to any disclaimer, the term of this patent is extended or adjusted under 35 U.S.C. 154(b) by 37 days.

(21) Appl. No.: 11/846,091

(22) Filed: Aug. 28, 2007

(65) Prior Publication Data
US 2009/0056428 A1 Mar. 5, 2009

(51) Int. Cl.
*G01B 5/28* (2006.01)
(52) U.S. Cl. ...................................... 73/105
(58) Field of Classification Search ............... None
See application file for complete search history.

(56) References Cited

U.S. PATENT DOCUMENTS

| | | | |
|---|---|---|---|
| 5,248,199 A | 9/1993 | Reading | |
| 5,729,026 A | 3/1998 | Mamin et al. | |
| 5,929,438 A * | 7/1999 | Suzuki et al. | 250/306 |
| 6,249,747 B1 | 6/2001 | Binnig et al. | |
| 6,487,515 B1 | 11/2002 | Ghoshal | |
| 6,835,589 B2 | 12/2004 | Pogge et al. | |
| 7,319,224 B2 * | 1/2008 | Park et al. | 250/306 |
| 2005/0051515 A1 | 3/2005 | Nam | |
| 2006/0057757 A1 | 3/2006 | Park et al. | |
| 2006/0254345 A1 | 11/2006 | King et al. | |

OTHER PUBLICATIONS

Chui, B. W. et al., "Low-Stiffness Silicon Cantilever with Integrated Heaters and Piezoresistive Sensors for High-Density Data Storage," *Journal of Microelectromechanical Systems*, vol. 7, pp. 69-78, 1998.
Luo, K. et al., "Nanofabrication of Sensors on Cantilever Probe Tips for Scanning Multiprobe Microscopy," *Appl. Phys. Lett.*, vol. 68(3), pp. 325-327, 1996.
Majumdar, A. "Scanning thermal microscopy," *Annual Review of Materials Science*, vol. 29, pp. 505-585, 1999.
Pantazi, A. et al., "A Servomechanism for a Micro-electro-mechanical-system-based scanning-probe data storage device," *Nanotechnology*, vol. 15, pp. S612-S621, 2004.
Shi, L. et al., "Design and batch fabrication of probes for sub-100 nm scanning thermal microscopy," *Journal of Microelectromechanical Systems*, vol. 10, pp. 370-378, 2001.
Shi, L. et al., "Thermal Transport Mechanisms at Nanoscale Point Contacts," *Journal of Heat Transfer*, vol. 124, pp. 329-337, 2002.
Williams, C.C. et al, "Scanning Thermal Profiler," *Appl. Phys. Lett*, vol. 49(23) pp. 1587-1589, 1986.

* cited by examiner

*Primary Examiner*—Robert R Raevis
(74) *Attorney, Agent, or Firm*—Morris Manning & Martin, LLP; Tim Tingkang Xia (57) ABSTRACT

A method of fabricating a nanoscale cantilever probe. In one embodiment, the method includes the steps of forming a cantilever having a tip vertically extending from an end portion of the cantilever, where the tip has an apex portion having a size in a range of about 1-1000 nm, and selectively doping the cantilever with a dopant to define a first doping region in the tip and a second doping region in the rest of the cantilever, where the dopant concentration of the first doping region is substantially lower than that of the second doping region.

4 Claims, 6 Drawing Sheets

CANTILEVER PROBE AND APPLICATIONS OF THE SAME

CROSS-REFERENCE TO RELATED PATENT APPLICATION

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [7] represents the 7th reference cited in the reference list, namely, M. A. Poggi, E. D. Gadsby, L. A. Bottomley, W. P. King, E. Oroudjev, and H. Hansma, "Scanning probe microscopy," *Analytical Chemistry*, vol. 76, pp. 3429-3443, Jun. 15, 2004.

FIELD OF THE INVENTION

The present invention generally relates to a cantilever probe, and in particular to a cantilever probe having an integrated nanoscale heater, and methods of fabricating same.

BACKGROUND OF THE INVENTION

Thermal analysis (TA) refers to methods for measuring the temperature-dependant properties of materials. Both physical and chemical properties of materials may depend upon temperature. Examples of temperature-dependant materials properties include but are not limited to: glass transition temperature, melting temperature, magnetic coercivity, electrical resistance, electrical capacitance, index of refraction, solubility, and pH.

Usually, a material of interest may be a mixture, blend, or compound that has heterogeneity such that the temperature-dependence of one or more properties varies from location to location within the material. In this case, accurate TA measurements must measure spatially-resolved thermal properties in order to understand and tailor the overall material response. Novel TA techniques capable of high spatial resolution require instrumentation that is distinct from conventional TA, in that they must deliver heat and measure temperature at one specific location in the material of interest. The resolution of the TA technique is governed by the size of the heater and thermometer.

Conventional probes for high-resolution TA include a thin metal wire [1, 2]. These metal wire probes are bent and etched in order to form a tip. When an electrical current flows through the wire, heat is dissipated in the etched region of the wire. The wire has an electrical resistance that is a function of temperature, and thus it is possible to simultaneously measure both heating power and temperature in the tip. This metal wire probe can be mounted in an atomic force microscope (AFM) system [3]. The AFM system allows the probe tip to be precisely positioned in contact with a target substrate of interest. The AFM is able to measure the probe bending as it is pushing into the target substrate, and thus sample topography can be measured using the metal wire tip. Furthermore, the penetration of the tip into the substrate can also be measured as a function of probe tip temperature and heating power. However, the metal wire probe has one significant drawback, which is that the spatial resolution is in the range of 1 µm or greater. Thus the metal wire probe cannot be used to perform TA with a resolution much smaller than 1 µm.

For highly local TA, it would desirable to have a probe with a tip that is sharper than the conventional wire probe tip, and it would further be desirable to have a probe with an integrated heater-thermometer that is smaller than 1 µm.

In general, AFM probes with metal tips have not achieved nanometer-scale resolution, as it is difficult to fabricate electrically active metal probes that are extremely sharp [4-6]. However, silicon probes may be made to have tips with better than 10 nm sharpness, and that may make images with atomic-scale resolution [7].

Silicon probes made with integrated heater-thermometers have been demonstrated [8]. These silicon probes are originally designed for data storage [9]. They may be attractive for TA, as they have an extremely sharp tip and have an integrated heater-thermometer. However the heater-thermometer of the silicon probe is quite large at about 5×10 µm, and is not integrated into the end of the sharp tip but rather resides nearby. Thus, it would be desirable to have a sharp silicon probe tip having a heater-thermometer integrated into the tip, such that the size of the heater-thermometer is in the same or similar size to the sharpness of the probe tip, which however has not been available due to great technical barriers to be overcome.

Therefore, a heretofore unaddressed need exists in the art to address the aforementioned deficiencies and inadequacies.

SUMMARY OF THE INVENTION

In one aspect, the present invention relates to a cantilever probe. In one embodiment, the cantilever probe includes a handle portion having a first end and an opposite, second end and a handle portion body formed therebetween; a cantilever transversally projecting away from the first end of the handle portion such that an angle, α, is formed between the cantilever and the handle portion body, where the cantilever has a first end portion, an opposite, second end portion, and a cantilever body formed therebetween, and the second end portion is anchored at the first end of the handle portion; a tip vertically extending from the first end portion of the cantilever; and an electrode member formed on the second end portion of the cantilever. The handle portion has a silicon wafer and a silicon dioxide layer formed on the silicon wafer. The angle α is in the range of 0<α<180°.

The cantilever is formed to have a first region and a second region in connection with the first region, where each region has an electrical resistivity. The tip is in the first region. The electrical resistivity of the first region is substantially higher than that of the second region such that when an electrical current flows through the cantilever from the electrode member, resistive heating occurs substantially in the tip. In one embodiment, the tip has a taper shape having an apex portion and at least one slope portion extending from the apex portion. The apex portion of the tip has a size in a range of about 1-1000 nm, and defines an angle β in the range of 0<β<90°.

In one embodiment, the cantilever and the tip is formed of silicon. The silicon can be an n-type silicon or a p-type silicon. The first and second regions and of the cantilever are defined by a selective doping of the cantilever with a dopant, where each doping region has a dopant concentration. The dopant can be an n-type dopant or a p-type dopant. The dopant concentration of the first region is substantially lower than that of the second region of the cantilever. In one embodiment, the first region of the cantilever is doped through a native doping of the silicon forming the cantilever such that the first region in the tip has a native dopant concentration, where the native doping forms a highly resistive heating region in the tip. In another embodiment, the first region of cantilever is further doped through a tailoring doping such that the apex portion of the tip has a tailored dopant concentration that is higher than the native dopant concentration.

Additionally, the second region extends through the at least one slope portion of the tip such that the dopant concentration in the at least one slope portion of the tip is substantially higher than that of the apex portion of the tip, thereby allowing an electrical current to flow to the tip without inducing heating in the cantilever away from the tip.

In another aspect, the present invention relates to a cantilever probe. In one embodiment, the cantilever probe has a cantilever having a shoulder that has a first end portion and an opposite, second end portion and a pair of arms respectively extending from the first and second end portions of the shoulder; and a tip vertically extending from the shoulder of the cantilever. The cantilever and the tip are doped to have a first doping region in the tip and a second doping region in the pair of arms of the cantilever, respectively. The first doping region is in connection with the second doping region. Each doping region has a dopant concentration. The dopant concentration of the first doping region is substantially lower than that of the second doping concentration such that when an electrical current flows through the cantilever, resistive heating occurs substantially in the tip.

In one embodiment, each of the cantilever and the tip is formed of silicon. The tip has a taper shape having an apex portion and at least one slope portion extending from the apex portion. The apex portion of the tip has a size in a range of about 1-1000 nm.

The second doping region may extend through the at least one slope portion of the tip so that the dopant concentration in the at least one slope portion of the tip is substantially higher than that of the apex portion of the tip, thereby allowing an electrical current to flow to the tip without inducing heating in the cantilever away from the tip.

In one embodiment, the first doping region of the cantilever is doped through a native doping of the silicon such that the first doping region in the tip has a native dopant concentration, where the native doping forms a highly resistive heating region in the tip. In another embodiment, the first doping region of the cantilever is further doped through a tailoring doping such that the apex portion of the tip has a dopant concentration that is higher than the native dopant concentration.

In yet another aspect, the present invention relates to a cantilever probe. In one embodiment, the cantilever has a cantilever having a first end portion, an opposite, second end portion, and a cantilever body formed therebetween; and a tip having an apex portion, a bottom portion and a tip body formed therebetween, vertically extending from the first end portion of the cantilever such that the bottom portion of the tip is in the first end portion of the cantilever. The cantilever and the tip are doped to have a dopant concentration that varies spatially from the apex potion to the bottom portion of the tip and from the first end portion to the second end portion of the cantilever such that the dopant concentration in the apex portion of the tip is substantially lower than that in the bottom portion of the tip, which is substantially identical to that in the first end portion of the cantilever, which in turn, is substantially lower than that in the second end portion of the cantilever. In operation, when an electrical current flows through the cantilever, resistive heating occurs substantially in the apex portion of the tip.

In a further aspect, the present invention relates to a method of fabricating a nanoscale cantilever probe. In one embodiment, the method includes the steps of (a) providing a silicon-on-insulator (SOI) wafer having a silicon handle portion wafer, a buried silicon dioxide layer formed on the silicon handle portion wafer, and a silicon device layer formed on the buried silicon dioxide layer; (b) patterning the silicon device layer to define a cantilever structure having a first end portion and an opposite, second end portion and a tip vertically extending from the first end portion of the cantilever structure; (c) selectively doping the defined cantilever structure with a dopant to form a first doping region and a second doping region therein, wherein the first doping region contains the tip and is in connection with the first doping region; (d) metallizing the second doping region of the cantilever structure to form an electrode member thereon; and (e) sequentially etching off portions of the silicon handle portion wafer and the buried silicon dioxide layer on the backside of the cantilever structure to form a cantilever.

In one embodiment, the patterning step is performed with photolithography and etching processes. The metallizing step is performed with a metal deposition process.

The sequentially etching step includes the steps of etching off a portion of the silicon handle portion wafer on the backside of the cantilever structure to expose a corresponding region of the buried silicon dioxide layer; and etching off the uncovered region of the buried silicon dioxide layer on the backside of the cantilever structure to form the cantilever.

The selectively doping step comprises the steps of (i) doping the defined cantilever structure with the dopant; and (ii) repeating step (i) in a selected region till the first doping region and the second doping region are formed in the defined cantilever structure such that the dopant concentration of the first doping region is substantially different from that of the second doping region. The second doping region is substantially coincident with the selected region so that the dopant concentration of the first doping region is substantially lower than that of the second doping region. Each of the first and second doping regions and has an electrical resistivity. The electrical resistivity of the first doping regions is substantially higher than that of the second doping regions.

In yet a further aspect, the present invention relates to a method of fabricating a nanoscale cantilever probe. In one embodiment, the method includes the steps of forming a cantilever having a tip vertically extending from an end portion of the cantilever, wherein the tip has an apex portion having a size in a range of about 1-1000 nm; and selectively doping the cantilever with a dopant to form a first doping region in the tip and a second doping region in the rest of the cantilever, wherein the dopant concentration of the first doping region is substantially lower than that of second doping region. In one embodiment, the first doping region corresponds to a native doping region.

The method may further include the step of tailoring the impurity doping in the apex portion of the tip. The tailoring step in one embodiment includes the steps of patterning the apex portion of the tip; and doping the patterned apex portion with a second dopant to form a third doping region having a doping concentration that is higher than that of the first doping region and substantially lower than that of the second doping region. The patterning step is performed with a lithography process. The third doping region in the apex of the tip is in connection with the second doping region. The third doping region has an electrical resistivity that is lower than that of the first doping region and substantially higher than that of the second doping region.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

Additionally, some terms used in this specification are more specifically defined below, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "about" or "approximately" shall generally mean within 20 percent, preferably within 10 percent, and more preferably within 5 percent of a given value or range. Numerical quantities given herein are approximate, meaning that the term "about" or "approximately" can be inferred if not expressly stated.

The description will be made as to the embodiments of the present invention in conjunction with the accompanying drawings in FIGS. 1-4. In accordance with the purposes of this invention, as embodied and broadly described herein, this invention, in one aspect, relates to a cantilever probe having an integrated heater-thermometer, where the heater-thermometer is of size 150 nm or smaller. The extremely small size of the heater-thermometer demands a novel fabrication technique, which is also disclosed below. The cantilever heater-thermometer is formed from the doped silicon, with the specific characteristics of the heater-thermometer depending upon the doping concentration, processing conditions, and size/shape of the doped region(s).

Figure 1:
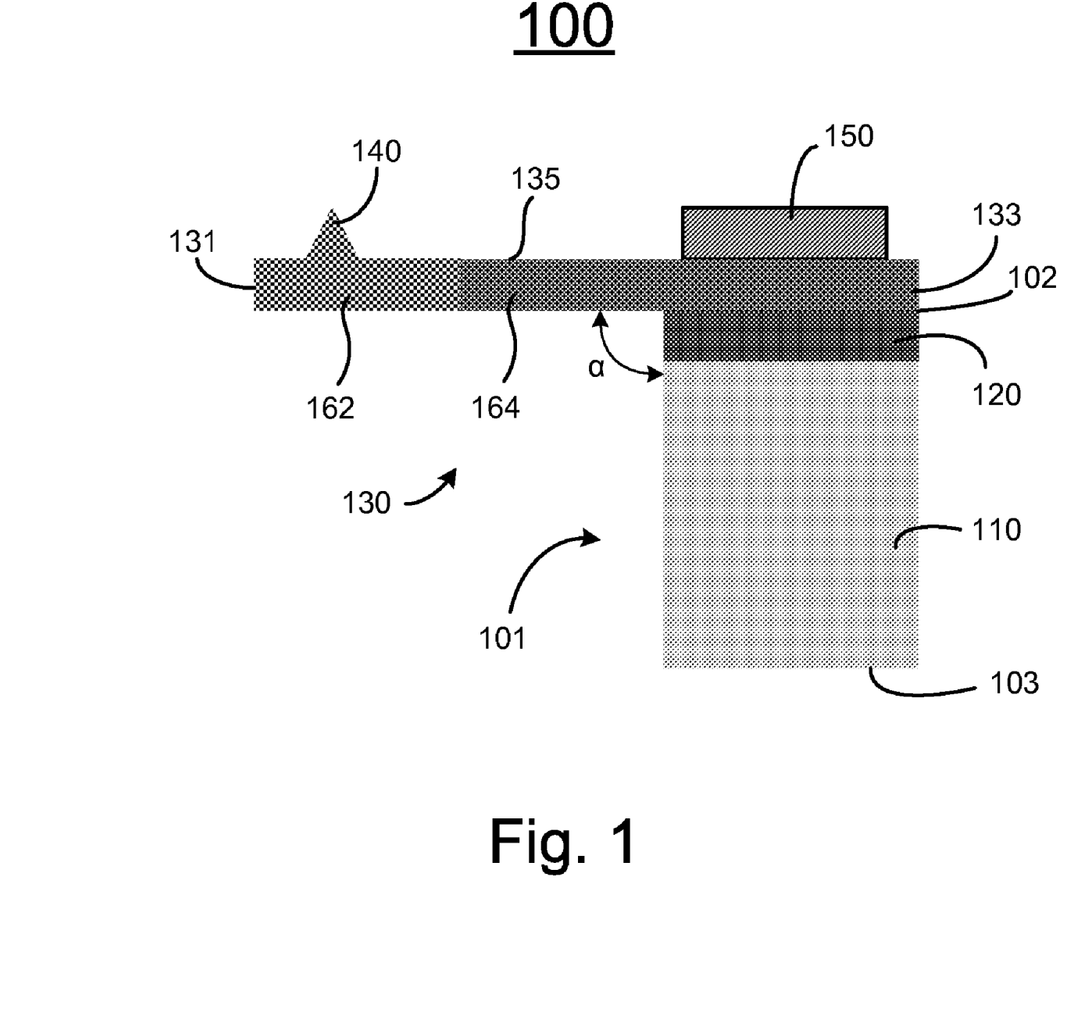
FIG. 1 shows schematically a nanoscale cantilever probe according to one embodiment of the present invention.
Figure 2A:
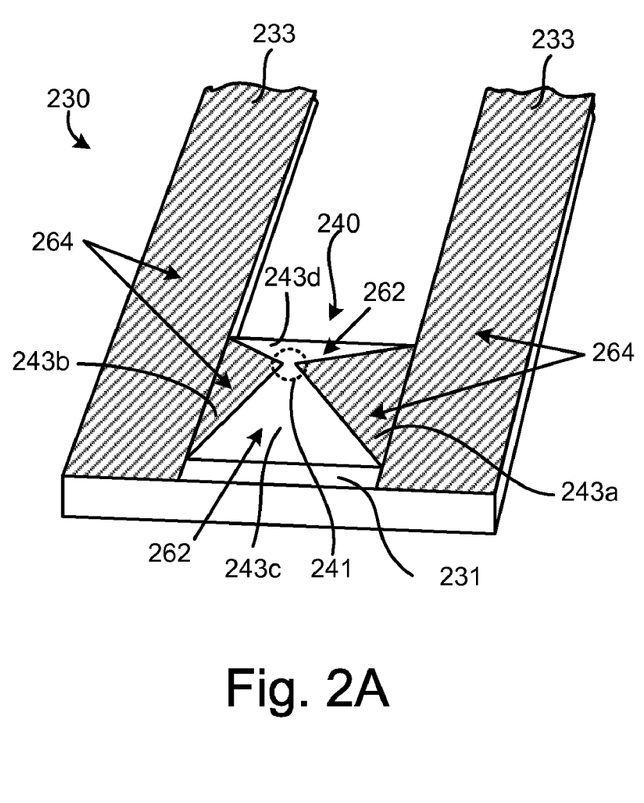
FIG. 2 shows schematically a nanoscale cantilever probe according to another embodiment of the present invention, (A) a perspective view, (B) a front view, (C) a top view, and (D) a side view.
Figure 2B:
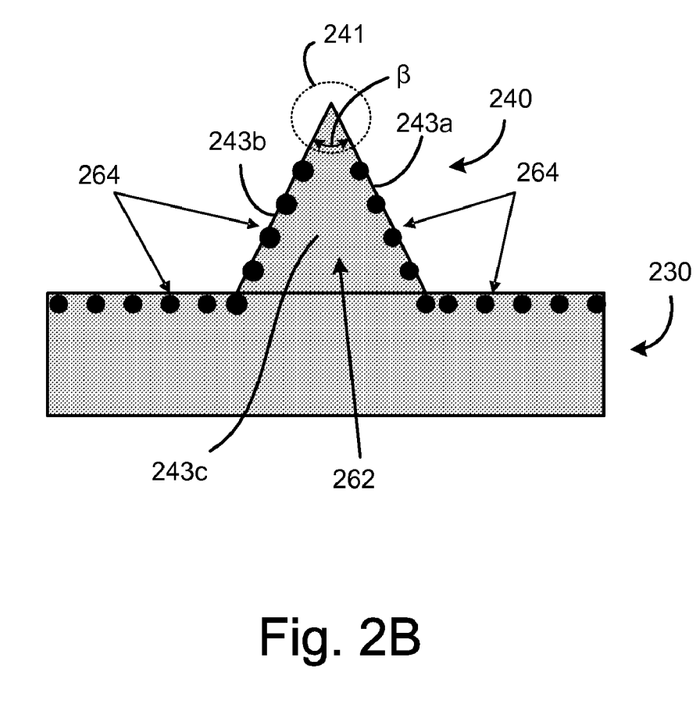
Figure 2C:
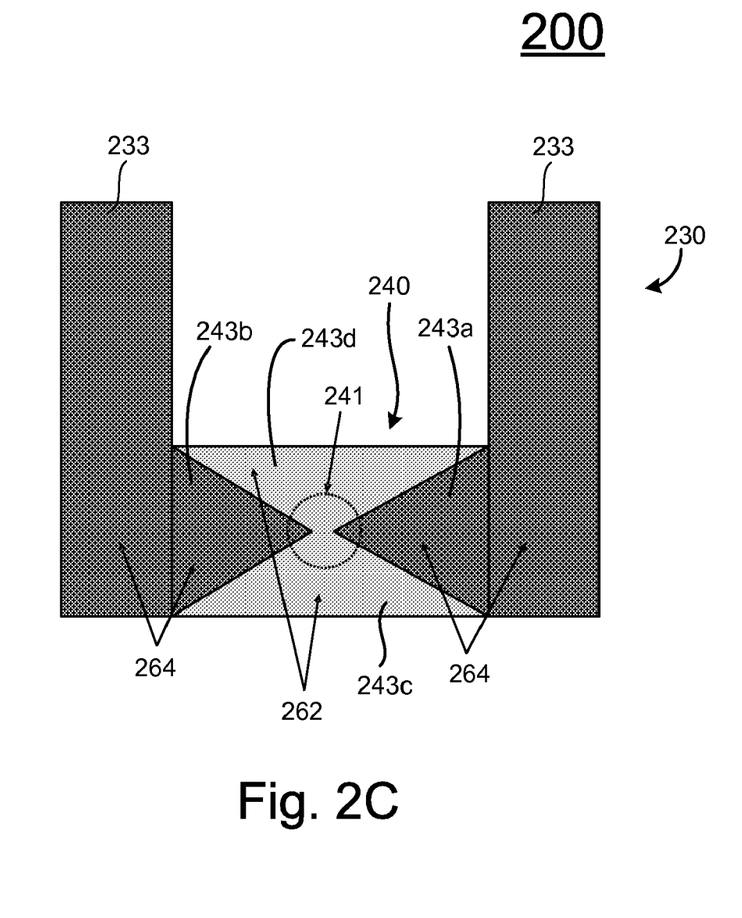
Figure 2D:
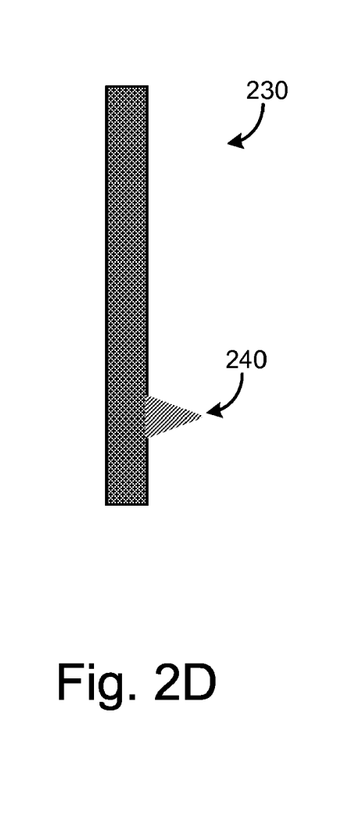
Figure 3A:
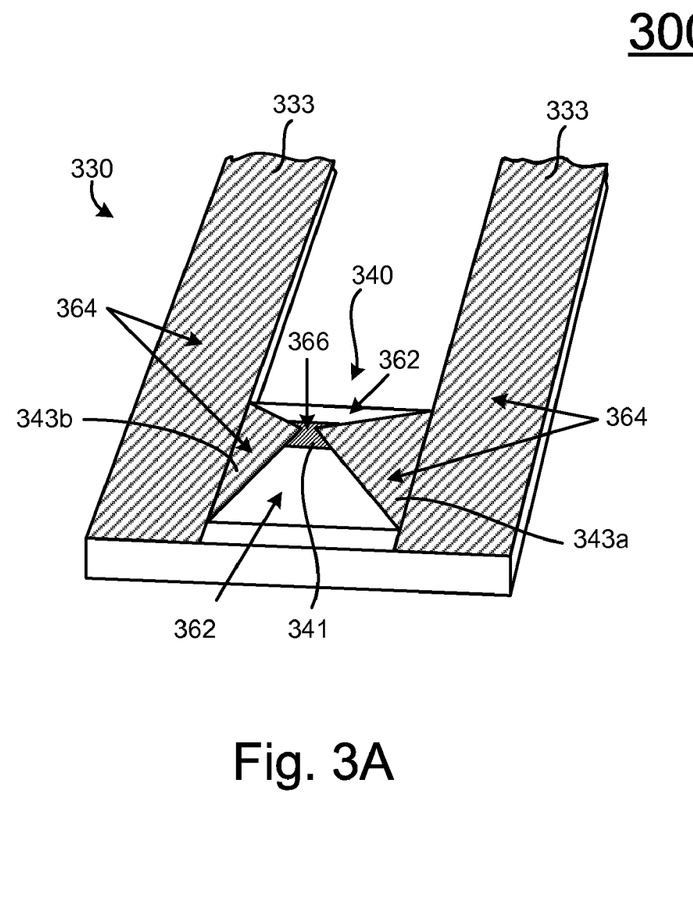
FIG. 3 shows schematically a nanoscale cantilever probe according to an alternative embodiment of the present invention, (A) a perspective view, (B) a front view, (C) a top view, and (D) a side view.
Figure 3B:
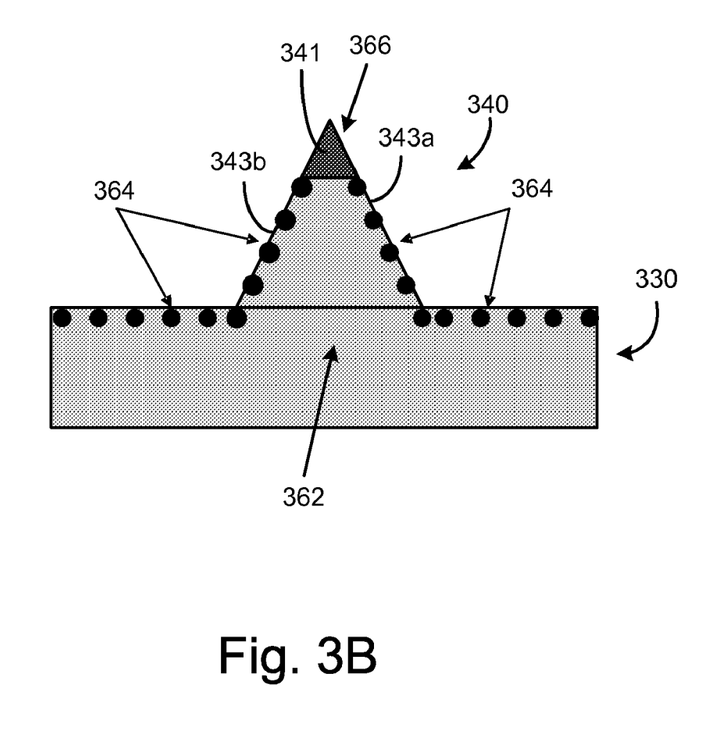
Figure 3C:
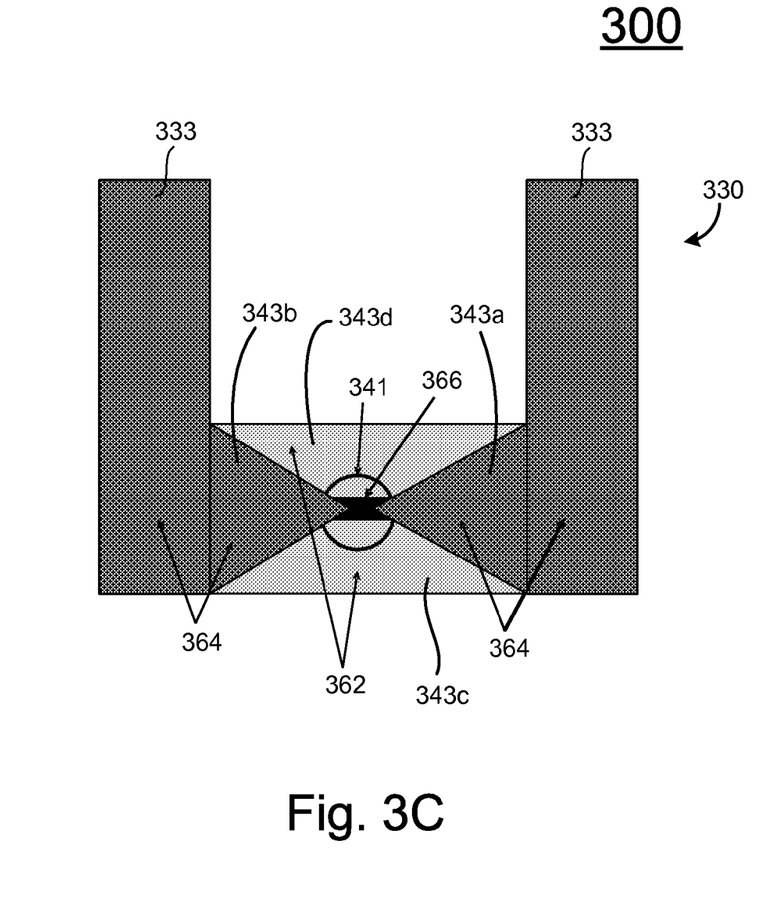
Figure 3D:
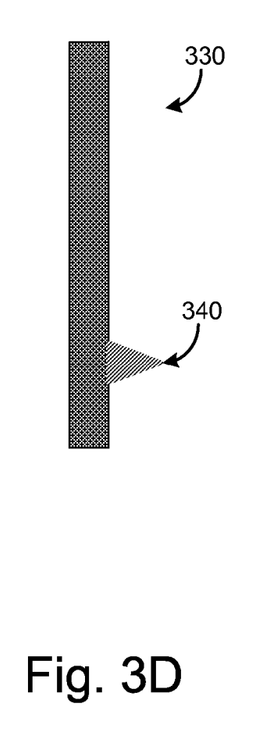

Referring to FIG. 1, a cantilever probe 100 is schematically shown according to one embodiment of the present invention. The cantilever probe 100 has a handle portion 101, a cantilever 130 with an integrated probe tip 140 projecting away from the handle portion 101, and an electrode member 150 formed on the cantilever 130. The cantilever 130 and the tip 140 are formed of an n-type or p-type silicon. The electrode member 150 is adapted for electrically accessing to the cantilever 120.

The handle portion 101 includes a silicon wafer 110 and a silicon dioxide layer 120 formed on the silicon wafer 110. The cantilever 130 has a first end portion 131, an opposite, second end portion 133, and a cantilever body 135 formed therebetween, and transversally projects away from the top surface 102 of the silicon dioxide layer 120. The probe tip 140 extends vertically from the first end portion 131 of the cantilever 130. In one embodiment, the tip 140 has a taper shape having an apex portion and one or more slope portions extending from the apex portion. The apex portion of the tip 140 has a size in a range of about 1-1000 nm and defines an angle $\beta$ that is in a range of $0<\beta<90°$.

As shown in FIG. 1, the cantilever 130 is formed to have a first region 162 and a second region 164 in contact with the first region 162. The tip 140 is in the first region 162. Each region has an electrical resistivity. The electrical resistivity of the first region 162 is substantially higher than that of the second region 164. In this case, when an electrical current flows through the cantilever 130 from the electrode member 150, resistive heating occurs in the tip 140. The cantilever 130 is formed such that the region of the highest electrical resistivity is near the cantilever tip 140. When an electrical current flows through the cantilever, resistive heating occurs in this region of high electrical resistance. The region of high electrical resistance can be formed either from native doping of the cantilever tip or through tailored doping that will yield a dopant concentration different than that of the native doping, which is used to form the cantilever 130 and the tip 140. The regions of low electrical resistance in the cantilever arms (or legs) and other cantilever regions away from the tip are formed with a high doping concentration that is tailored to those regions, as described below.

Referring to FIG. 2, a cantilever probe 200 having a cantilever 230 and a tip 240 is schematically shown according to another embodiment of the present invention.

The cantilever 230 has a shoulder 231 having a first end portion and an opposite, second end portion and a pair of arms (or legs) 233 respectively extending from the first and second end portions of the shoulder 231. The tip 240 vertically extends from the shoulder 231 of the cantilever 230. In this exemplary embodiment shown in FIG. 2, the tip 240 is a taper (pyramid) having an apex portion 241 and four slope portions 243a-243d extending from the apex portion 241. Of them, the slope portions 243a and 243b are respectively extend from the apex portion 241 to the pair of arms (or legs) 233 of the cantilever 230. The apex portion 241 of the tip 240 is formed to have a dimension of about 1000 nm or less. Other geometrical types of tips can also be utilized to practice the present invention.

One or more doping processes can be utilized in connection with the cantilever 230 and the tip 240 to form a first doping region 262 in the tip 240 and a second doping region 264 in the rest of the cantilever 230. Each doping region has a dopant concentration. The corresponding dopant can be an n-type dopant or a p-type dopant. According to one embodiment of the present invention, the dopant concentration of the first doping region 262 is substantially lower than that of the second doping region 264. In this embodiment, the second doping region (a high doping region) 264 extends through the slope portions 243a and 243b of the tip 240 so that the dopant concentration in the slope portions 243a and 243b of the tip 240 is substantially higher than that of the apex portion 241 of the tip 240. Accordingly, when an electrical current flows through the arms 233 of the cantilever 230, resistive heating occurs in the apex portion 241 (a region of low dopant concentrations) of the tip 240, i.e., the electrical current flows to the tip 240 without significantly inducing heating in the arms 233 of the cantilever 230 away from the tip 240 relative to the apex portion 241. The taper of the high doping region allows the location of highest electrical field to be in the cantilever tip 240. The geometry and location of the tapered high doping region allows for a sharp hot spot within the cantilever tip that is 150 nm or less in dimension sizewise.

The dopant concentration of the first doping region 262 may be corresponding to the native dopant concentration of the silicon of which forms the cantilever 230 and the tip 240. Likewise, the native doping of the silicon forms a highly resistive heating region (the apex portion 241) in the tip 241.

Referring to FIG. 3, a cantilever probe 300 having a cantilever 330 and a tip 340 is schematically shown according to an alternative embodiment of the present invention. In this embodiment, the apex portion 341 of the tip 340 has a tailored dopant concentration that is higher than the native dopant concentration of the first doping region 362 but lower that that of the second doping region (high doping region) 364. This can be implemented by applying an additional second doping process to the cantilever probe, for example, shown in FIG. 2. The additional doping is patterned just at the apex 341 of the tip 340, so as to form a low doping region 366 in the apex 341 of the tip 340, which is in connection with the high doping region 364 that exists on either side 343a or 343b of the tip 340. The low doping region 366 has an electrical resistivity that is lower than that of the native doped region 362, but much higher than that of the high doping region 364. When an electrical voltage is held across the arms (or legs) 333 of the cantilever 330, electrical current flows through the highly doped silicon legs 333 and also the low doping region 366 in the apex 341 of the tip 340. Since the nanometer-scale low doping region 366 has the highest resistance in the circuit, resistive heating occurs only therein.

One aspect of the present invention relates to a cantilever probe. In one embodiment, the cantilever has a cantilever having a first end portion, an opposite, second end portion, and a cantilever body formed therebetween; and a tip having an apex portion, a bottom portion and a tip body formed therebetween, vertically extending from the first end portion of the cantilever such that the bottom portion of the tip is in the first end portion of the cantilever. The cantilever and the tip are doped to have a dopant concentration that varies spatially from the apex potion to the bottom portion of the tip and from the first end portion to the second end portion of the cantilever such that the dopant concentration in the apex portion of the tip is substantially lower than that in the bottom portion of the tip, which is substantially identical to that in the first end portion of the cantilever, which in turn, is substantially lower than that in the second end portion of the cantilever. In operation, when an electrical current flows through the cantilever, resistive heating occurs substantially in the apex portion of the tip.

Figure 4:
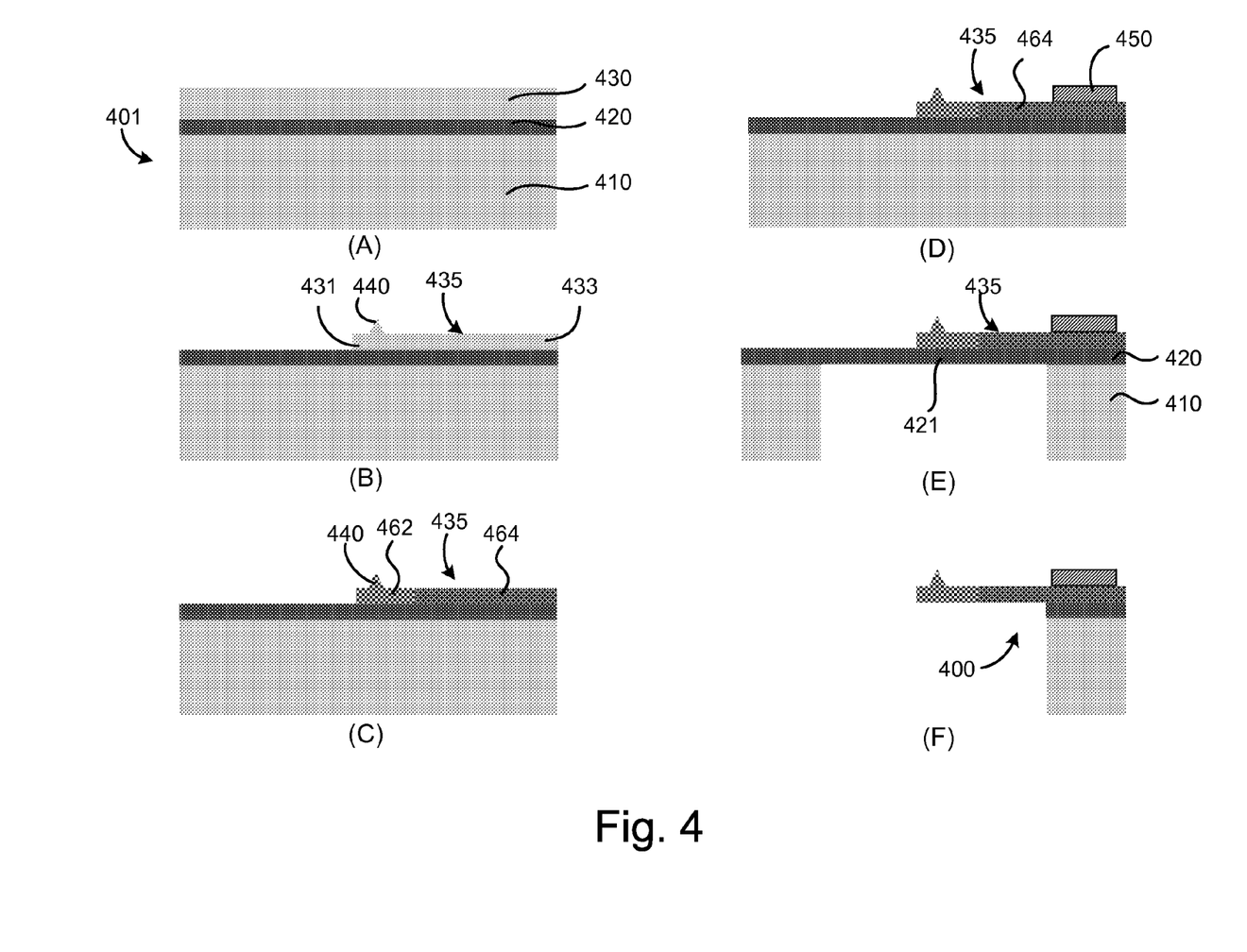
FIG. 4 shows schematically fabricating processes (A)-(F) of a nanoscale cantilever probe according to one embodiment of the present invention.

FIGS. 4A-4F show schematically a manufacturing process for the cantilever having the nanometer-scale heater-thermometer. The manufacturing process starts with a silicon-on-insulator (SOI) wafer 401. The SOI wafer 401 has a thick silicon handle portion wafer 410, a thin buried silicon dioxide layer 420 formed on the thick silicon handle portion wafer 410, and a thin silicon device layer 430 formed on the thin buried silicon dioxide layer 420, as shown in FIG. 4A. The thin silicon device layer 430 may be natively doped.

Standard photolithography and etching processes are applied to the SOI wafer 401 to form a cantilever structure 435 having a first end portion 431 and an opposite, second end portion 433 and a tip 440 vertically extending from the first end portion 431 of the cantilever structure 435, as shown in FIG. 4B. The tip 440 is formed to have an apex portion with a size in a range of about 1-1000 nm. As described below, the apex portion of the tip 240 can be utilized as a heater-thermometer.

Then, one or more impurity doping steps are performed on the cantilever structure 435 to define the local electrical characteristics of the cantilever probe. As a result, a first doping region 462 and a second doping region 464 are formed therein, where the first doping region 462 is in connection with the second doping region 464, as shown in FIG. 4C. The tip 440 is in the first doping region 462. The dopant concentration of the first doping region 462 is substantially lower than that of the second doping region 464. In other words, the electrical resistivity of the first doping regions 462 is substantially higher than that of the second doping regions 464. The tip 440 is thus formed to have the highest electrical resistivity. The first doping region 462 can be a native doping region. The first and second doping regions can also be referred as low and high doping regions, respectively.

As shown in FIG. 4D, metal deposition on the second doping region 464 of the cantilever structure 435 forms an electrode member 450, which allows for electrical access to the doped silicon cantilever. Etching process steps are sequentially performed through the backside of the cantilever structure 435 to etch off a portion of the silicon handle portion wafer 410, thereby uncovering a corresponding region 421 of the buried silicon dioxide layer 420, and then etch off the uncovered region 421 of the buried silicon dioxide layer 420 to form the cantilever probe 400, as shown in FIGS. 4E and 4F.

Furthermore, an additional doping step (not shown) may be applied to the cantilever probe to form a highly resistive region of low doping concentration in the cantilever tip. In this doping step, the doping is patterned just at the apex of the tip to form a low doping region therein, which is in connection with the high doped region that exists on either side of the tip. The additional doping step is patterned into a region of size near 150 nm or less, using a lithography technique. The low doping region has an electrical resistivity that is lower than that of the native doped silicon cantilever, but much higher than that of the high doping region. When an electrical voltage is held across the arms (or legs) of the cantilever, a corresponding electrical current flows through the highly doped silicon arms, and also through the low doping region near the tip. Since the nanoscale low doping region has the highest resistance in the circuit, resistive heating occurs substantially in the nanoscale low doping region.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1] A. Hammiche, M. Reading, H. M. Pollock, M. Song, and D. J. Hourston, "Localized Thermal Analysis Using a Miniaturized Resistive Probe," *Review of Scientific Instruments*, vol. 67, pp. 4268-4274, 1996.

[2] A. Hammiche, D. J. Hourston, H. M. Pollock, M. Reading, and M. Song, "Scanning thermal microscopy: Subsurface imaging, thermal mapping of polymer blends, and localized calorimetry," *Journal of Vacuum Science & Technology B*, vol. 14, pp. 1486-1491, March-April 1996.

[3] G. Binnig, C. F. Quate, and C. Gerber, "Atomic Force Microscope," *Physical Review Letters*, vol. 56, pp. 930-933, 1986.

[4] A. Majumdar, "Scanning thermal microscopy," *Annual Review of Materials Science*, vol. 29, pp. 505-585, 1999.

[5]. L. Shi, O. Kwon, A. C. Miner, and A. Majumdar, "Design and batch fabrication of probes for sub-100 nm scanning thermal microscopy," *Journal of Microelectromechanical Systems*, vol. 10, pp. 370-378, 2001.

[6] A. Majumdar, J. P. Carrejo, and J. Lai, "Thermal Imaging Using the Atomic Force Microscope," *Applied Physics Letters*, vol. 62, pp. 2501-2503, 1993.

[7] M. A. Poggi, E. D. Gadsby, L. A. Bottomley, W. P. King, E. Oroudjev, and H.

Hansma, "Scanning probe microscopy," *Analytical Chemistry*, vol. 76, pp. 3429-3443, Jun. 15, 2004.

[8] B. W. Chui, T. D. Stowe, Y. S. Ju, K. E. Goodson, T. W. Kenny, H. J. Mamin, B. D. Terris, and R. P. Ried, "Low-Stiffness Silicon Cantilever with Integrated Heaters and Piezoresistive Sensors for High-Density Data Storage," *Journal of Microelectromechanical Systems*, vol. 7, pp. 69-78, 1998.

[9] G. Binnig, M. Despont, U. Drechsler, W. Haberle, M. Lutwyche, P. Vettiger, H. J. Mamin, B. W. Chui, and T. W. Kenny, "Ultrahigh-Density Atomic Force Microscopy Data Storage with Erase Capability," *Applied Physics Letters*, vol. 76, pp. 1329-1331, 1999.

What is claimed is:

1. A cantilever probe, comprising:
   (a) a handle portion having a first end and an opposite, second end and a handle portion body formed therebetween;
   (b) a cantilever transversally projecting away from the first end of the handle portion such that an angle, $\alpha$, is formed between the cantilever and the handle portion body, wherein the cantilever has a first end portion, an opposite, second end portion, and a cantilever body formed therebetween, and wherein the second end portion is anchored at the first end of the handle portion;
   (c) a tip vertically extending from the first end portion of the cantilever; and
   (d) an electrode member formed on the second end portion of the cantilever,
   wherein the cantilever is formed to have a first region and a second region in connection with the first region, each region having an electrical resistivity;
   wherein the tip is in the first region;
   wherein the electrical resistivity of the first region is substantially higher than that of the second region such that when an electrical current flows through the cantilever from the electrode member, resistive heating occurs substantially in the tip;
   wherein the tip has a taper shape having an apex portion and at least one slope portion extending from the apex portion;
   wherein the cantilever is formed of silicon, and wherein the silicon comprises an n-type silicon or a p-type silicon;
   wherein the first and second regions and of the cantilever are defined by a selective doping of the cantilever with a dopant, each doping region having a dopant concentration;
   wherein the dopant concentration of the first region is substantially lower than that of the second region of the cantilever;
   wherein the first region of the cantilever is doped through a native doping of the silicon forming the cantilever such that the first region in the tip has a native dopant concentration; and
   wherein the first region of the cantilever is further doped through a tailoring doping such that the apex portion of the tip has a tailored dopant concentration that is higher than the native dopant concentration.

2. The cantilever probe of claim 1, wherein the second region extends through the at least one slope portion of the tip such that the dopant concentration in the at least one slope portion of the tip is substantially higher than that of the apex portion of the tip, thereby allowing an electrical current to flow to the tip without inducing heating in the cantilever away from the tip.

3. A cantilever probe, comprising:
   (a) a cantilever having a shoulder that has a first end portion and an opposite, second end portion and a pair of arms respectively extending from the first and second end portions of the shoulder; and
   (b) a tip vertically extending from the shoulder of the cantilever,
   wherein the cantilever and the tip are doped to have a first doping region in the tip and a second doping region in the pair of arms of the cantilever, respectively, each doping region having a dopant concentration, wherein the dopant concentration of the first doping region is substantially lower than that of the second doping concentration such that when an electrical current flows through the cantilever, resistive heating occurs substantially in the tip;

wherein the tip has a taper shape having an apex portion and at least one slope portion extending from the apex portion;

wherein each of the cantilever and the tip is formed of silicon, and wherein the silicon comprises an n-type silicon or a p-type silicon;

wherein the first doping region of the cantilever is doped through a native doping of the silicon such that the first doping region in the tip has a native dopant concentration; and wherein the first doping region of the cantilever is further doped through a tailoring doping such that the apex portion of the tip has a dopant concentration that is higher than the native dopant concentration.

4. The cantilever probe of claim 3, wherein the second doping region extends through the at least one slope portion of the tip so that the dopant concentration in the at least one slope portion of the tip is substantially higher than that of the apex portion of the tip, thereby allowing an electrical current to flow to the tip without inducing heating in the cantilever away from the tip.

* * * * *